United States Patent
Ishikawa et al.

[11] Patent Number: 5,821,552
[45] Date of Patent: Oct. 13, 1998

[54] RADIATION IMAGE INFORMATION READ APPARATUS

[75] Inventors: Hiromi Ishikawa; Yoji Okazaki, both of Kanagawa-ken, Japan

[73] Assignee: Fuji Photo Film Co., Ltd., Kanagawa-ken, Japan

[21] Appl. No.: 651,611

[22] Filed: May 22, 1996

[30] Foreign Application Priority Data

May 22, 1995 [JP] Japan .................................. 7-122734

[51] Int. Cl.$^6$ .................................................. G03B 42/02
[52] U.S. Cl. .......................................... 250/585; 250/584
[58] Field of Search .................................. 250/584, 585, 250/586

[56] References Cited

U.S. PATENT DOCUMENTS 4,818,880  4/1989  Matsuda et al. ........................ 250/584
5,461,240  10/1995  Karasawa ................................ 250/585

*Primary Examiner*—Edward J. Glick
*Attorney, Agent, or Firm*—Sughrue, Mion, Zinn, Macpeak & Seas, PLLC

[57] ABSTRACT

In a radiation image information read apparatus, a stimulable phosphor sheet, on which radiation image information has been stored, is scanned with stimulating rays, and light emitted by the stimulable phosphor sheet upon stimulation thereof is photoelectrically detected by a photodetector and converted into an electric image signal bearing thereon the radiation image information. A solid laser crystal which emits a laser beam having a wavelength of $\lambda 2$ pumped by a laser beam at a wavelength of $\lambda 1$ from a laser diode is combined with a nonlinear optical crystal which converts the laser beam at $\lambda 2$ to a laser beam at $\lambda 3$ within the stimulating wavelength range of the stimulable phosphor sheet, is employed as a source of the stimulating light. A filter which cuts the laser beam at $\lambda 3$ and transmits light emitted from the stimulable phosphor sheet, is disposed between the stimulable phosphor sheet and the photodetector. There are disposed between the stimulating light source and the photodetector a lens which focuses the laser beam at $\lambda 3$ on a predetermined position, and an aperture plate which is disposed in the predetermined position and permits most of the laser beam at $\lambda 3$ to pass therethrough while cutting most of the laser beam at $\lambda 1$.

2 Claims, 5 Drawing Sheets

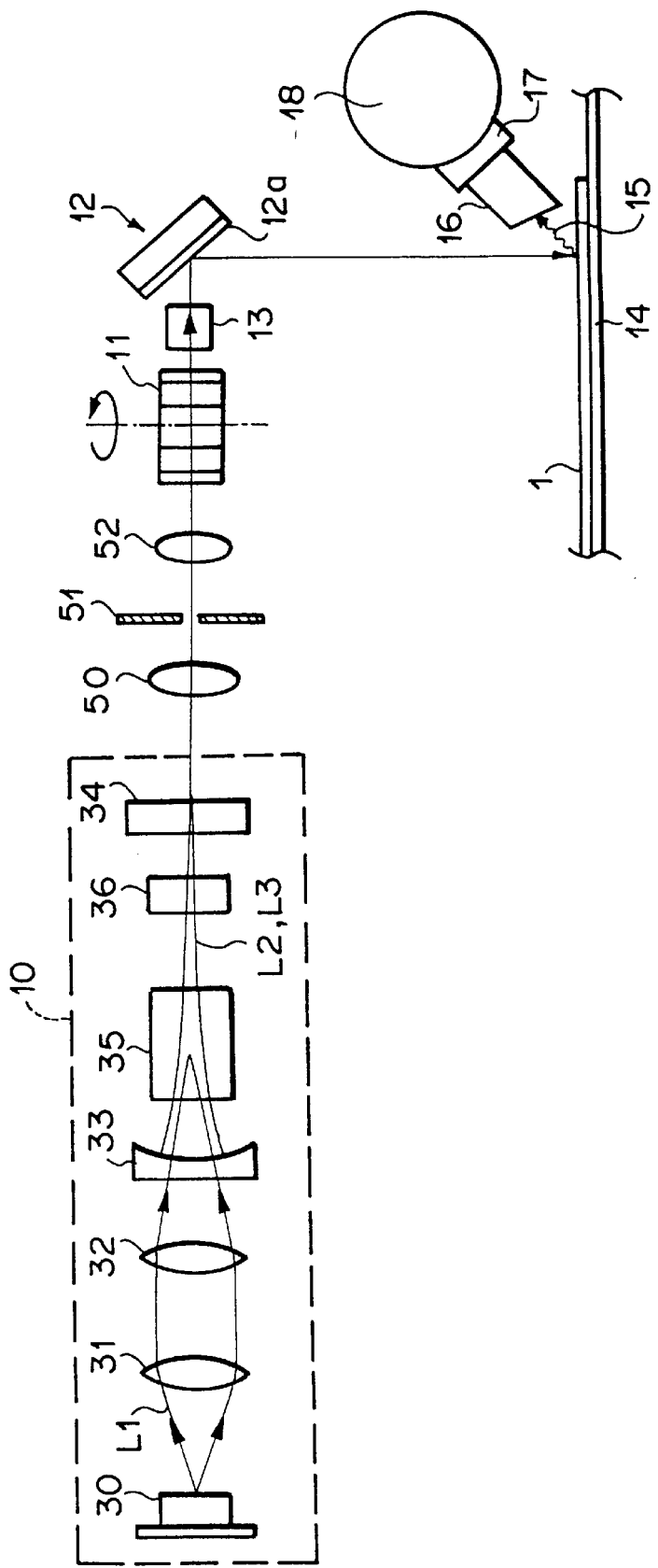
F I G. 1

F I G. 2
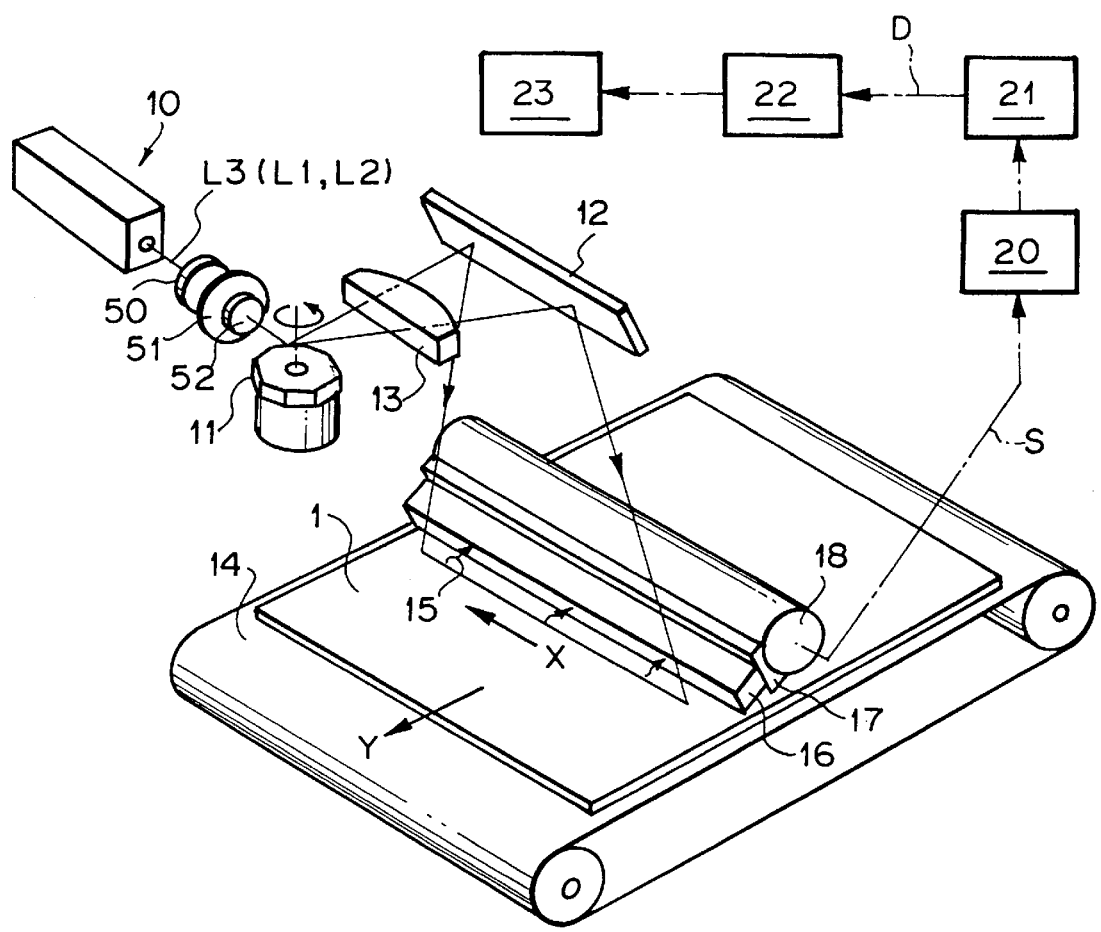

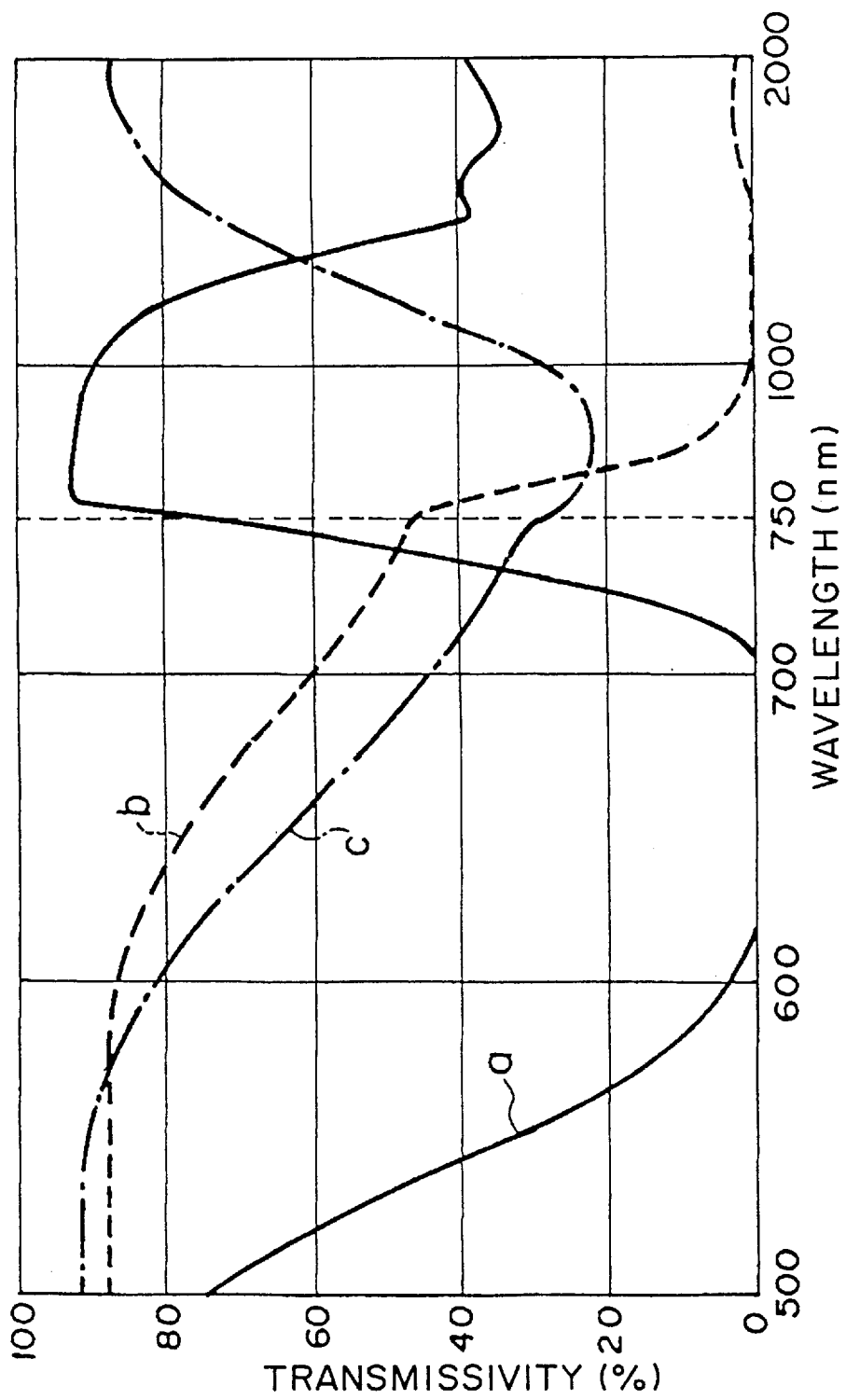

RADIATION IMAGE INFORMATION READ APPARATUS

BACKGROUND OF THE INVENTION

1. Field of the Invention

This invention relates to a radiation image read apparatus in which a stimulable phosphor sheet, on which radiation image information has been stored, is scanned with stimulating rays and light emitted by the stimulable phosphor sheet upon stimulation thereof is photoelectrically detected and converted into an electric image signal bearing thereon the radiation image information, and more particularly to such a radiation image information read apparatus in which a laser diode pumped solid laser associated with a nonlinear optical crystal for converting the wavelength of the solid laser beam is employed as the light source for the stimulating rays.

2. Description of the Related Art

When certain kinds of phosphors are exposed to such radiation as X-rays, $\alpha$-rays, $\beta$-rays, $\gamma$-rays, cathode rays or ultraviolet rays, they store a part of the energy of the radiation. Then, when the phosphor which has been exposed to the radiation is exposed to a stimulating ray such as a visible ray, light is emitted from the phosphor in proportion to the amount of energy stored thereon during its exposure to the radiation. A phosphor exhibiting such properties is referred to as "a stimulable phosphor".

As disclosed, for instance, in Japanese Unexamined Patent Publication Nos. 55(1980)-12492 and 56(1981)-11395, it has been proposed to use a stimulable phosphor in a radiation image recording and reproducing system. Specifically, a sheet provided with a layer of a stimulable phosphor (hereinafter referred to as "a stimulable phosphor sheet") is exposed to radiation passing through an object such as the human body to have a radiation image of the object stored thereon and then is two-dimensionally scanned with a stimulating light beam such as a laser beam, which causes the stimulable phosphor sheet to emit light in proportion to the stored radiation energy. The light emitted from the stimulable phosphor sheet upon stimulation thereof is photoelectrically detected and converted to electric image signals, and the radiation image of the object is reproduced as a visible image on a recording material such as a photographic paper or a display such as a cathode ray rube on the basis of the electric image signals.

There has been an expectation of employing a laser diode pumped solid laser as the stimulating light source in a radiation image information read apparatus for reading a radiation image information stored on a stimulable phosphor sheet. The laser diode pumped solid laser comprises a laser diode and a solid laser crystal which emits a laser beam having a wavelength of $\lambda 1$ when pumped by a laser beam having a wavelength of $\lambda 2$ emitted from the laser diode. However since the oscillating wavelength of a presently available laser diode pumped solid laser is much longer than a wavelength at which the stimulating efficiency is maximized for a stimulable phosphor sheet which has been put into practice, it is necessary to use the laser diode pumped solid laser together with a nonlinear optical crystal which shortens the wavelength of the solid laser beam.

When such a laser diode pumped solid laser associated with a nonlinear optical crystal is used as the stimulating light source, there arises a problem that the stimulating laser beam, that is, the laser beam after wavelength conversion, and laser beams other than the stimulating laser beam such as the pumping laser beam emitted from the laser diode and the fundamental laser beam before wavelength conversion are detected by the photodetector together with light emitted from the stimulable phosphor sheet upon stimulation thereof, which appear as noise in the reproduced radiation image. Especially since having a high output power, e.g., 2 W, in order to ensure an output power of, for instance, 300 to 500 mW of the laser beam after wavelength conversion, the pumping laser beam is apt to be detected by the photodetector.

SUMMARY OF THE INVENTION

In view of the foregoing observations and description, the primary object of the present invention is to provide a radiation image information read apparatus in which the stimulating laser beam and other laser beams described above are prevented from being detected by the photodetector, whereby generation of noise in the reproduced radiation image can be prevented.

In the radiation image information read apparatus in accordance with the present invention, a solid laser crystal which emits a laser beam having a wavelength of $\lambda 2$ pumped by a laser beam at a wavelength of $\lambda 1$ from a laser diode and is combined with a nonlinear optical crystal which converts the laser beam at $\lambda 2$ to a laser beam at $\lambda 3$ within the stimulating wavelength range of the stimulable phosphor sheet is employed as the stimulating light source, and the radiation image information read apparatus of the present invention is characterized in that a filter which cuts the laser beam at $\lambda 3$ and well transmits light emitted from the stimulable phosphor sheet upon stimulation by the laser beam at $\lambda 3$ is disposed in the optical path of the laser beam between the stimulable phosphor sheet and the photodetector, and there are disposed in the optical path of the laser beam between the stimulating light source and the photodetector a lens which focuses the laser beam at $\lambda 3$ on a predetermined position and an aperture plate which is disposed in the predetermined position, on which the laser beam at $\lambda 3$ is focused, and permits most of the laser beam at $\lambda 3$ to pass therethrough while cutting most of the laser beam at $\lambda 1$.

It is preferred that a second filter which cuts the laser beam at $\lambda 1$ be disposed in the optical path of the laser beam between the stimulating light source and the photodetector.

In the radiation image information read apparatus of the present invention, the pumping laser beam at $\lambda 1$ and the solid laser beam at $\lambda 2$ emanate from the stimulating light source together with the stimulating laser beam at $\lambda 3$. The pumping laser beam at $\lambda 1$ out of those laser beams which is apt to be detected by the photodetector is cut by the aperture plate and is prevented from impinging upon the photodetector.

Thus the laser beam at $\lambda 1$ is prevented from generating noise in a reproduced radiation image by a simple structure formed by a lens and an aperture plate.

A part of the stimulating laser beam at $\lambda 3$ reflects at the surface of the stimulable phosphor sheet and travels toward the photodetector together with the light emitted from the stimulable phosphor sheet upon stimulation thereof. However in the radiation image information read apparatus of the present invention, the stimulating laser beam at $\lambda 3$ travelling toward the photodetector is cut by the filter and prevented from generating noise in a reproduced radiation image.

Further when a second filter is disposed in the optical path of the laser beam between the stimulating light source and the photodetector, the pumping laser beam at $\lambda 1$ is more effectively prevented from impinging upon the photodetector.

BRIEF DESCRIPTION OF THE DRAWINGS

FIG. 1 is a developed side view of an important part of the radiation image information read apparatus in accordance with an embodiment of the present invention, FIG. 2 is a schematic perspective view of the radiation image information read apparatus.

DESCRIPTION OF THE PREFERRED EMBODIMENT

Figure 3:
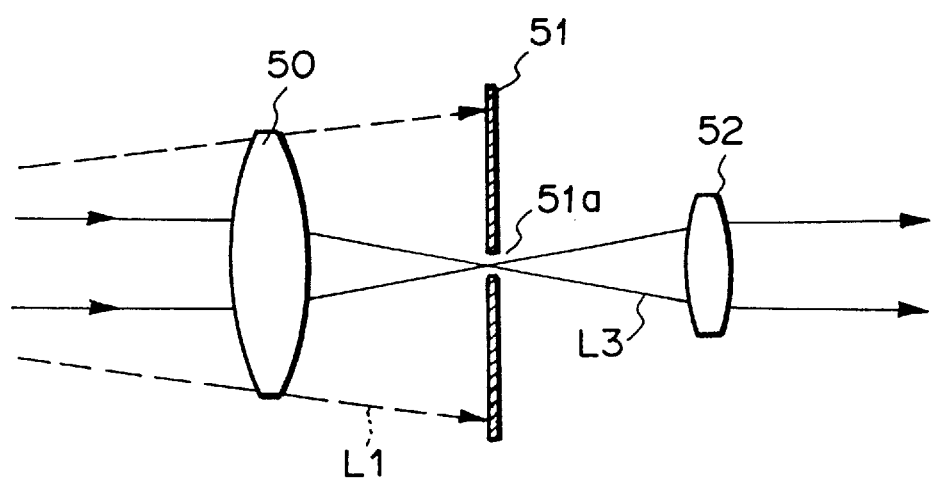
FIG. 3 is a schematic view for illustrating the operation of the aperture plate employed in the radiation image information read apparatus.

As shown in FIG. 2, a stimulating laser beam L3 at $\lambda 3$ emitted from a stimulating light source 10 travels through a condenser lens 50, an aperture plate 51 and a collimator lens 52 and impinges upon a deflector 11 (e.g., a polygonal mirror) to be deflected thereby. The deflected laser beam L3 reflects downward at a mirror 12 and impinges upon a stimulable phosphor sheet 1 through a scanning lens 13 which is generally of an fθ lens. The stimulable phosphor sheet 1 stores thereon a radiation image of an object and is conveyed in the direction of arrow Y by a sub-scanning means 14 such as of an endless belt. At the same time, the laser beam L3 deflected in the manner described above scans the stimulable phosphor sheet 1 in the direction of arrow X (main scanning).

Parts of the stimulable phosphor sheet 1 exposed to the stimulating laser beam L3 emits light 15 in an amount proportional to the radiation image information stored thereon. The light 15 emitted from the stimulable phosphor sheet 1 enters a light guide 16 extending at least over the entire width of the stimulable phosphor sheet 1 and travels inside the light guide 16 to impinge upon a long photomultiplier 18. The photomultiplier 18 has a light receiving face substantially equal to the light guide 16 in length, and the light 15 impinges upon the light receiving face of the photomultiplier 18 through a first filter 17 to be described later. The photomultiplier 18 outputs an analog signal S corresponding to the amount of the light 15 emitted from the stimulable phosphor sheet 1, that is, representing the radiation image information stored on the stimulable phosphor sheet 1.

The signal S is logarithmically amplified by a logarithmic amplifier 20 and sampled by an A/D convertor 21 on the basis of predetermined pixel clocks to be converted to digital image signals D. The image digital signals D are subjected to image processing such as gradation processing by an image processing circuit 22 and transmitted to an image reproducing system 23 to be used in reproduction of a radiation image. The image reproducing system 23 may be a display such as a CRT or a light scanning recording system which records an image on a photosensitive film by scanning the film with a light beam.

In FIG. 1, the stimulating light source 10 is a laser diode pumped solid laser provided with a wavelength convertor and comprises a laser diode 30 emitting a pumping laser beam L1, a collimator lens 31 which collimates the diverging laser beam L1, a condenser lens 32 which focuses the collimated laser beam L1, a pair of resonator mirrors 33 and 34 forming a Fabry-Perot resonator, a YLF crystal (a solid laser crystal) 35 disposed between the mirrors 33 and 34 and a LBO crystal (a nonlinear optical crystal) 36 disposed between the mirrors 33 and 34.

In this particular embodiment, the laser diode 30 emits a laser beam L1 at $\lambda 1$ (=797 nm). The YLF crystal 35 emits a laser beam L2 at $\lambda 2$ (=1313 nm) when Nd ions therein are excited by the laser beam L1. The laser beam L2 resonates between the resonator mirrors 33 and 34 and enters the LBO crystal 36 in a high intensity state, where the laser beam L2 is converted to a laser beam L3 having a wavelength of $\lambda 3$ (=$\lambda 2/2$=657 nm), that is, to a second harmonic. The laser beam L3 also resonates between the resonator mirrors 33 and 34 and a part of the laser beam L3 passes through the mirror 34 and travels toward the deflector 11.

Through a mirror exhibiting a high reflectivity to the pumping laser beam L1 having a wavelength of $\lambda 1$ (=797 nm) and the solid laser beam L2 having a wavelength of $\lambda 2$ (=1313 nm), i.e., the fundamental wave before wavelength conversion is used as the resonator mirror 34, the laser beams L1 and L2 partly pass through the mirror 34 together with the laser beam L3. The condenser lens 50, the aperture plate 51 and the collimator lens 52 are provided in order to cut the laser beam L1.

As shown in FIG. 3, the condenser lens 50 focuses the laser beam L3, which enters the condenser lens 50 in a state of substantially parallel rays, on a predetermined position, where the aperture plate 51 having a small aperture 51a is disposed. Most of the focused laser beam L3 passes through the aperture 51a and travels toward the deflector 11 through the collimator lens 52. On the other hand, most of the laser beam 11, which impinges upon the aperture plate 51 while greatly diverging, is cut by the aperture plate 51 though a very small part of the laser beam L1 passes through the aperture 51a.

When the laser beam L3 is a Gaussian beam, the diameter of the aperture 51a may be set, for instance, at about twice $1/e^2$ diameter (the diameter of a circle along which the beam intensity is $1/e^2$ of the peak value).

Figure 4:
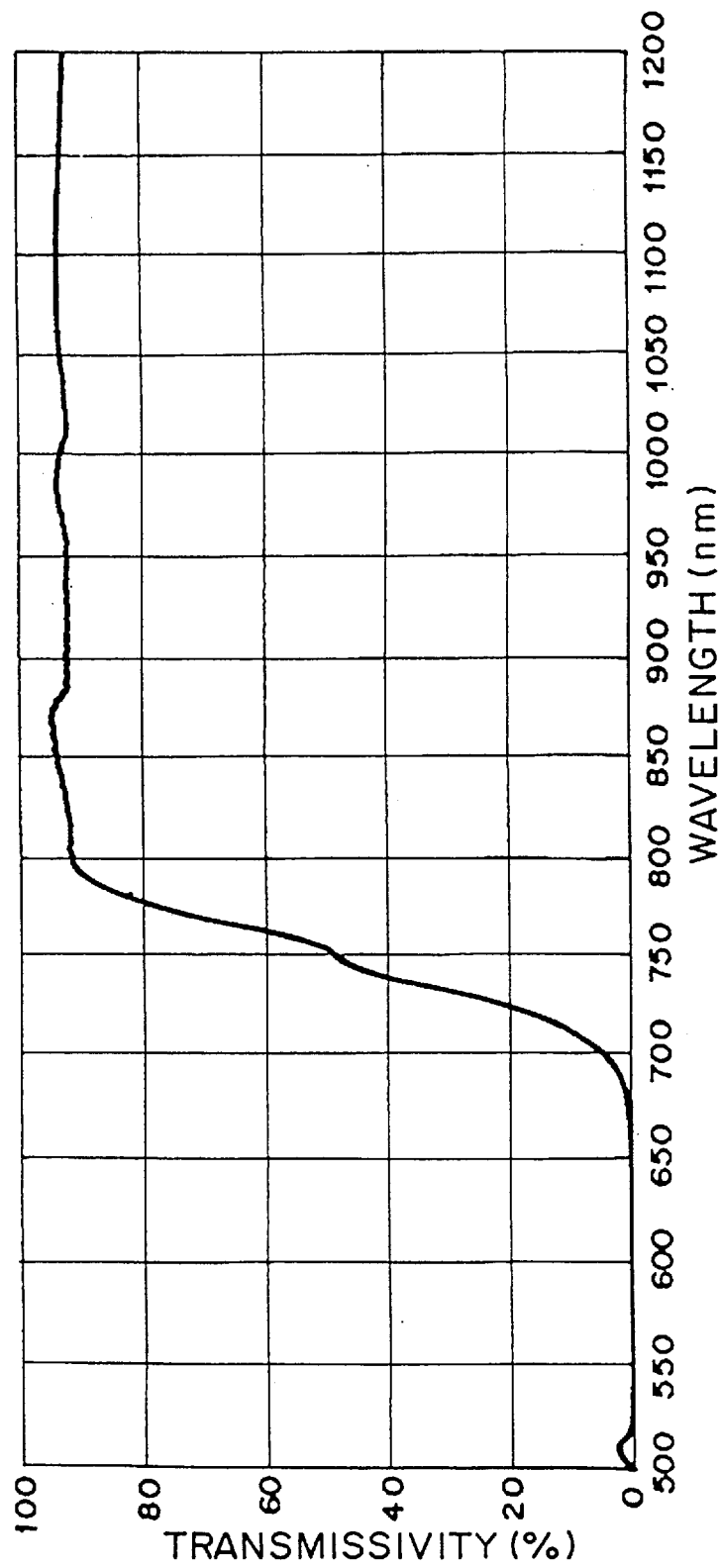
FIG. 4 is a graph showing the spectral transmission characteristics of the second filter employed in the radiation image information read apparatus, and FIG. 5 a graph showing the spectral transmission characteristics of the first filter employed in the radiation image information read apparatus.

In this embodiment, the mirror 12 is provided with a multilayered coating 12a which exhibits a high reflectivity of not lower than 99% to the laser beam L3 and exhibits a low reflectivity of lower than 10% (transmissivity of not lower than 90%) to the laser beams L1 and L2. That is, the mirror 12 functions as a second filter which cuts the laser beams L1 and L2. Such a mirror is available as a cold mirror manufactured by Fuji Photo Optical Co. Ltd., Japan. The spectral transmission characteristics of the mirror 12 are shown in FIG. 4.

Thus substantially only the laser beam L3 impinges upon the stimulable phosphor sheet 1. The stimulable phosphor sheet 1 has a layer of BaFX:Eu phosphors (wherein X represents one of Cl, Br and I). The wavelength at which the stimulating efficiency is maximized for the BaFX:Eu phosphors is around 600 nm and accordingly the stimulable phosphor sheet 1 is well stimulated by the laser beam L3 at $\lambda 3$ (=657 nm). The BaFX:Eu phosphors emit light 15 having a wavelength of about 400 nm upon stimulation thereof.

The first filter 17 inserted between the light guide 16 and the photomultiplier 18 transmits well the light 15 at 400 nm but absorbs well the laser beams L1, L2 and L3 respectively at $\lambda 1$ (=797 nm), $\lambda 2$ (=1313 nm) and $\lambda 3$ (=657 nm). As the filter 15, a filter supplied by Hoya Garasu K.K. associated with a filter No. HA-50 supplied by Hoya Garasu K.K. may be used. The spectral transmission characteristics of filters No. B-410 and No. HA-50 are respectively shown by lines a and b in FIG. 5.

As shown in FIG. 5, the filter No. B-410 exhibits a very low transmissivity to the laser beam L3 at $\lambda 3$ (=657 nm) but exhibits a substantially high transmissivity to wavelengths not shorter than 800 nm (e.g., 92.8% to 800 nm close to 797 nm, 71.2% to 1300 nm close to 1313 nm). Accordingly the filter No. B-410 is associated with the filter No. HA-50 in order to cut the laser beams L1 at 797 nm and L2 at 1313 nm. The filter No. HA-50 exhibits transmissivities of 27.7% and 0.2% respectively to 800 nm and 1300 nm. Though the transmissivities to the laser beams L1 and L2 of the filter 17 with such an arrangement are not as low as that of the laser beam L3, most of the laser beam L1 is cut by the aperture plate 51 and most of the remaining laser beam L1 and the laser beam L2 is cut by the mirror 12 (the second filter). Accordingly the laser beams L1 and L2 hardly impinge upon the photomultiplier 18.

By virtue of the first filter 17 and the mirror 12 which functions as the second mirror, the photomultiplier 18 receives substantially only the light 15 emitted from the stimulable phosphor sheet 1 and hardly receives the laser beams L1, L2 and L3. Accordingly generation of noise in the reproduced radiation image due to the laser beams L1, L2 and L3 can be surely prevented.

The mirror 12 need not function as the second filter. That is, since most of the laser beam L1 is cut by the aperture plate 51, and the laser beam L2 at $\lambda 2$ (=1313 nm) is inherently weak and at the same time greatly deviates from the sensitive region of the photomultiplier 18, which detects the light 15 having wavelengths near 400 nm, the laser beams L1 and L2 practically give rise to no problem even if they are not cut by the mirror 12.

The first filter 17 need not be limited to that described above, but may be selected according to the wavelength $\lambda 1$ of the pumping laser beam L1, the wavelength $\lambda 2$ of the solid laser beam L2, the wavelength $\lambda 3$ of the stimulating laser beam L3 and the wavelength of light emitted from the stimulable phosphor sheet 1 upon stimulation thereof. For example, a filter No. CL-500 supplied from HOYA Garasu K.K. may be used instead of the filter No. HA-50 employed in the embodiment described above. The spectral transmission characteristics of the filter No. CL-500 is as shown by line c in FIG. 5. The filter No. CL-500 exhibits transmissivities of 23.2% and 55.6% to 800 nm and 1300 nm, respectively. An additional filter for cutting third harmonic at 438 nm and/or fourth harmonic at 328 nm of the fundamental laser beam L2 at 1313 nm may be provided to prevent generation of noise by these harmonics.

YAG, $YVO_4$, LNP and the like as well as NYAB and the like which themselves have wavelength conversion function may also be used as the solid laser crystal instead of the YLF crystal employed in the embodiment described above. Further, KTP, $LiNbO_3$(LN), $LiTaO_3$(LT), $KNbO_3$, BBO, LN having a periodic inversion domain structure, MgO-LN having a periodic inversion domain structure, LT having a periodic inversion domain structure, and the like may also be used as the nonlinear optical crystal instead of the LBO crystal employed in the embodiment described above.

Further though, in the embodiment described above, second harmonic of a solid laser beam is used as the stimulating laser beam, third harmonic of a solid laser beam or a sum frequency beam of a solid laser beam and a laser beam emitted from a laser diode may also be used as the stimulating laser beam.

What is claimed is:

1. A radiation image information read apparatus in which a stimulable phosphor sheet, on which radiation image information has been stored, is scanned with stimulating light and light emitted by the stimulable phosphor sheet upon stimulation thereof is photoelectrically detected and converted into an electric image signal bearing thereon the radiation image information, comprising:

a stimulation light source having a laser diode, a solid laser crystal which emits a laser beam having a wavelength of $\lambda 2$ when pumped by a laser beam at a wavelength of $\lambda 1$ from said laser diode, and a nonlinear optical crystal which converts the laser beam at $\lambda 2$ to a laser beam at a wavelength of $\lambda 3$ within the stimulating wavelength range of the stimulable phosphor sheet;

a filter which cuts the laser beam at $\lambda 3$ and transmits light emitted from the stimulable phosphor sheet upon stimulation by the laser beam at $\lambda 3$, said filter disposed between the stimulable phosphor sheet and a photodetector, said photodetector for detecting the light emitted from the stimulable phosphor sheet upon stimulation;

a lens, disposed between the stimulating light source and the stimulable phosphor sheet, which focuses the laser beam at $\lambda 3$ on a predetermined position; and an aperture plate disposed in the predetermined position, said aperture plate permitting most of the laser beam at $\lambda 3$ to pass therethrough while cutting most of the laser beam at $\lambda 1$.

2. A radiation image information read apparatus as defined in claim 1 in which a second filter which cuts the laser beam at $\lambda 1$ is disposed between the predetermined position and the photodetector.

* * * * *